United States Patent
Collins, Jr.

(10) Patent No.: US 9,313,581 B2
(45) Date of Patent: Apr. 12, 2016

(54) HYBRID OPTICAL CODE SCANNER USER ALERT

(75) Inventor: Donald A. Collins, Jr., Buford, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/245,939

(22) Filed: Sep. 27, 2011

(65) Prior Publication Data

US 2013/0075471 A1 Mar. 28, 2013

(51) Int. Cl.
*G06K 7/00* (2006.01)
*H04R 25/02* (2006.01)
*G06K 7/10* (2006.01)

(52) U.S. Cl.
CPC .............. *H04R 25/02* (2013.01); *G06K 7/109* (2013.01); *G06K 7/1096* (2013.01); *G06K 7/10554* (2013.01); *G06K 7/10722* (2013.01)

(58) Field of Classification Search
USPC .......................... 235/440, 454, 455, 462, 472
See application file for complete search history.

(56) References Cited

U.S. PATENT DOCUMENTS

| | | | | |
|---|---|---|---|---|
| 4,521,678 A | * | 6/1985 | Winter | G06K 7/10881 235/462.25 |
| 8,177,134 B2 | * | 5/2012 | Havens | G06K 7/10633 235/462.22 |
| 8,439,263 B2 | | 5/2013 | Clark et al. | |
| 2012/0007738 A1 | * | 1/2012 | Barkan | G06K 7/10544 340/540 |
| 2012/0248188 A1 | * | 10/2012 | Kearney | G06K 7/10722 235/440 |

FOREIGN PATENT DOCUMENTS

| | | |
|---|---|---|
| CN | 2308916 | 2/1999 |
| CN | 1622114 A | 6/2005 |
| CN | 101160609 A | 2/2006 |
| CN | 1759405 A | 5/2010 |
| CN | 102945357 A | 2/2013 |
| EP | 1614056 | 8/2014 |
| WO | 2010045192 A1 | 4/2010 |

* cited by examiner

*Primary Examiner* — Michael G Lee
*Assistant Examiner* — Tabitha Chedekel
(74) *Attorney, Agent, or Firm* — Harden E. Stevens, III; Schwegman, Lundberg & Woessner

(57) ABSTRACT

A hybrid optical code scanner, system and method are presented for alerting a user when one or more events related to a handheld imaging scanner, undocked from the hybrid optical code scanner, occur. The events include moving the handheld imaging scanner beyond it communication range, keeping the handheld imaging scanner undocked beyond a predetermined period of time and activation of a switch on the handheld imaging scanner.

16 Claims, 6 Drawing Sheets

HYBRID OPTICAL CODE SCANNER USER ALERT

FIELD OF THE INVENTION

The present invention relates generally to a hybrid optical code scanner. More particularly, but not exclusively, the invention relates to a hybrid optical code scanner and system that includes sounding an alarm related to a removable handheld imaging scanner.

BACKGROUND

Any discussion of prior art throughout the specification should in no way be considered as an admission that such prior art is widely known or forms part of common general knowledge in the field.

A hybrid optical code scanner ("hybrid scanner") includes a laser scanner and an imaging scanner. The two scanners are used to independently read optical codes such barcodes presented to the scanner. The laser scanner reads a barcode by sweeping a laser beam across the barcode, capturing data representing the reflected laser light, and then processing the captured data. The imaging scanner reads a barcode by capturing a complete image of the barcode and then processing the image.

The imaging scanner is a removable handheld device. It can be removed from a docking station in the hybrid scanner and taken to a remote location to read an optical code. The code is then transmitted back to the hybrid scanner. Because the handheld imaging scanner can be operated remotely from the hybrid scanner, it is possible to take the handheld imaging scanner beyond its limited communication range. It is also possible to fail to return the handheld imaging scanner back to its docking station. Both of these conditions reduce the performance of the hybrid scanner because the imaging scanner is not available to scan optical codes at the hybrid scanner.

Therefore, there is a need for a hybrid optical code scanner that identifies these conditions and sounds an alarm to alert a user.

SUMMARY OF THE INVENTION

It is an object of the present invention to overcome or ameliorate at least one of the disadvantages of the prior art, or to provide a useful alternative.

Among its several aspects, one embodiment of the present invention recognizes a condition where the scanning performance of a hybrid optical code scanner is reduced because a handheld imaging scanner has been undocked from the hybrid optical code scanner but is not being used. When the handheld imaging scanner is docked with the hybrid optical code scanner is used along with a fixed laser scanner to scan optical codes, such as barcodes, presented to the hybrid optical code scanner for reading. However, if the handheld imaging scanner is undocked to scan a remote optical code but not returned to and docked with the hybrid optical code scanner, the performance of the hybrid optical code scanner is reduced because only the laser scanner is available for scanning optical codes presented to the hybrid optical code scanner.

One aspect of the present invention generates an audible alert to the user indicating that the handheld imaging scanner needs to be returned and docked with the hybrid scanner.

In accordance with an embodiment of the present invention, there is provided a hybrid optical code scanner comprising: a housing; a speaker located in the housing where the speaker produces audible sounds; a laser scanner adapted to read optical codes presented to the hybrid optical code scanner for reading, where the laser scanner is located in the housing; an imaging scanner adapted to read optical codes, where the imaging scanner is removable from the housing and when the imaging scanner is docked to the housing, it reads optical codes presented to the hybrid optical code scanner for reading and when the imaging scanner is undocked from the housing, it is operated by hand and reads optical codes remote from the hybrid optical code scanner; and where an audible alarm is sent to the speaker when an event related to the imaging scanner being removed from the housing occurs.

In accordance with an embodiment of the present invention, there is provided a computer implemented method for alerting a user when one of a plurality of events occurs related to an imaging scanner undocked from a hybrid optical code scanner, the method comprising: detecting the imaging scanner has been undocked from the hybrid scanner; in response to detecting the imaging scanner has been undocked, determining one of the following conditions: whether wireless communications between the imaging scanner and the hybrid scanner has been lost, and whether the imaging scanner has been undocked for more than a first period of time; and wherein in the event one or more of the conditions occurs, generating an audible alert.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawing, figures and charts.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

The claimed invention is described in combination with an assisted point of sale terminal 105. However, other embodiments are envisioned where the invention is used in combination with a kiosk or a self-service point of sale terminal.

Figure 1:
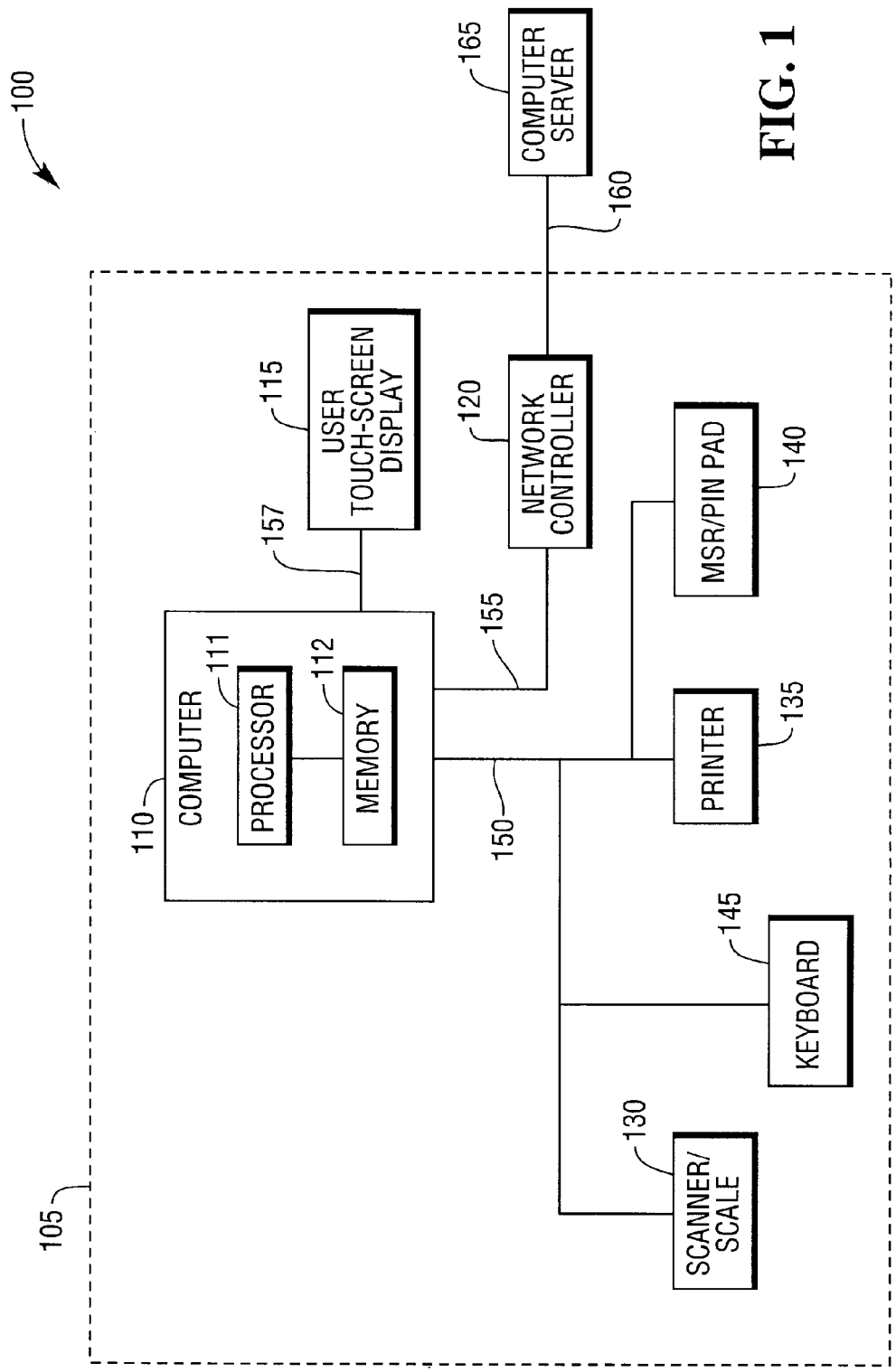
FIG. 1 is a high-level block diagram illustrating an exemplar embodiment of a point of sale system.

With reference to FIG. 1, there is provided a high-level block diagram illustrating an exemplar embodiment of an assisted point of sale (POS) system 100. The system 100 includes one or more assisted point of sale terminals 105 or self-service point of sale terminals (not shown) connected over a data network 160 to a computer server 165. The computer server 165, sometime referred to a store computer server, is a computer that provides resources and functions that are used by the one or more of the terminals 105. The resources and functions include a price lookup database and connections to one or more networks used to communicate with other computers (both local and remote) to perform additional functions, such as payment transactions using credit or debit card information.

The one or more terminals 105 connect to the server 165 over the network 160 to send and receive data. In some embodiments, the network 160 uses physical cables to connect each terminal 105 to the server 165 and in other embodiments, a wireless interface (not shown) is used to connect each terminal 105 to the server 165. Still other embodiments use a combination of physical and wireless connections.

The POS terminal 105 performs a number of functions including processing a purchase transaction. A purchase transaction begins when one or more items are presented to the terminal 105 for identification. As each item is indentified, a price is determined. In some embodiments, the terminal 105 retrieves the price for an item from the price lookup database on the server 165. Some items are sold by weight so the item's weight must be determined before a price can be determined. The terminal 105 maintains information on all items presented including a total price for all items. The terminal 105 processes a payment for the items once all items have been presented and a total price determined. The purchase transaction ends when payment for the presented items has been received or processed.

In the present embodiment, the POS terminal 105 includes a computer 110 that communicates with and controls a user touch-screen display 115, a keyboard 145, a network controller 120, a printer 135, an MSR/PIN pad 140, and a scanner and scale combination (scanner) 130. The computer 110 includes a processor 111, memory 112 and interface circuitry (not shown). The memory 112 includes both short and long term memory.

Terminal software is stored in the memory 112 and when the terminal software is executed by the processor 111, it causes the processor 111 to communicate with and control all the devices of the terminal 105. The terminal software further causes the processor 111 to provide all the features and functions of the terminal 105 including the user interface.

The computer 110 communicates with the other devices of the terminal 105 over a plurality of computer data buses 150, 155, 157. In one embodiment, a peripheral bus 150 is implemented using a Universal Serial Bus (USB). The network controller 120 is connected to the computer 110 using a standard PC bus 155 based on the Peripheral Component Interconnect (PCI) standard. The user touch-screen display 115 uses an industry standard video bus 157 such as HDMI and a separate USB bus for receiving touch screen data.

Figure 2:
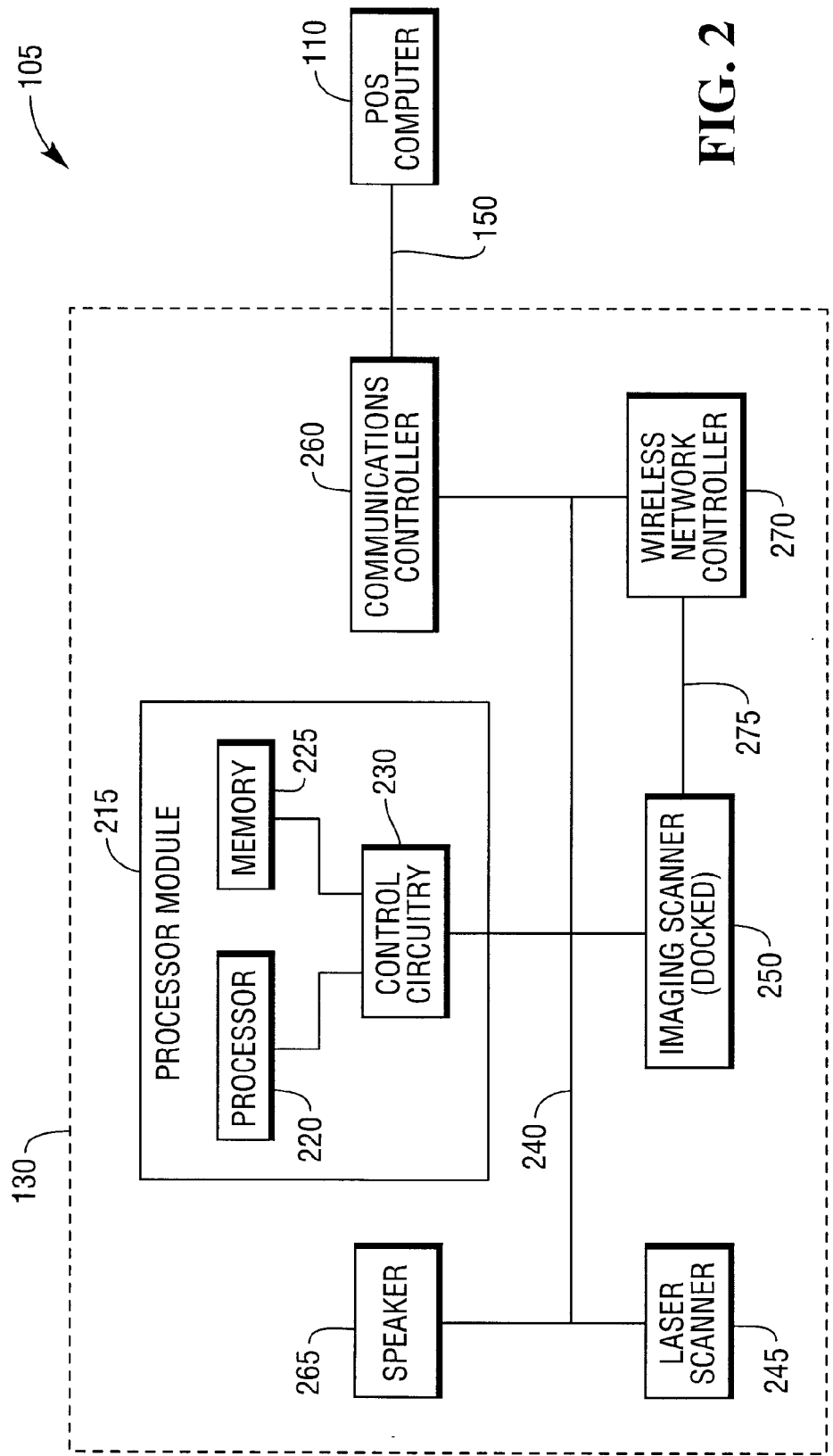
FIG. 2 is a high-level block diagram illustrating an exemplar embodiment of a hybrid optical code scanner.

Referring now to FIG. 2, there is provided a high-level block diagram illustrating an exemplar embodiment of a point of sale terminal 105. The terminal 105 includes the hybrid optical code scanner ("hybrid scanner") 130 and the POS computer 110 where both are connected by the computer network 150. The hybrid optical code scanner 130 includes a processor module 215, a laser scanner 245, an imaging scanner 250, a communications controller 260, a wireless network controller 270 and a speaker 265.

Within the processor module 215, there is included a processor 220, a memory 225 and control circuitry 230. The memory 225 includes both volatile and non-volatile memory. Software stored in the memory 225 is executed by the processor 220 which causes the processor 220 to control the devices and operation of the hybrid optical code scanner 130. The control circuitry 230 provides an interface between the processor 220, the memory 225, and a bus 240 used to communicate with other devices that comprise the hybrid optical code scanner 130. These devices include the laser scanner 245, the imaging scanner 250, the communications controller 260 and the wireless network controller 270. The control circuitry 230 further includes a timer device controlled by the software. The timer device can be programmed by the software to generate a timer control signal after a period of time has passed. The time period can represent a timeout signal that would require an action by the software.

Figure 4A:
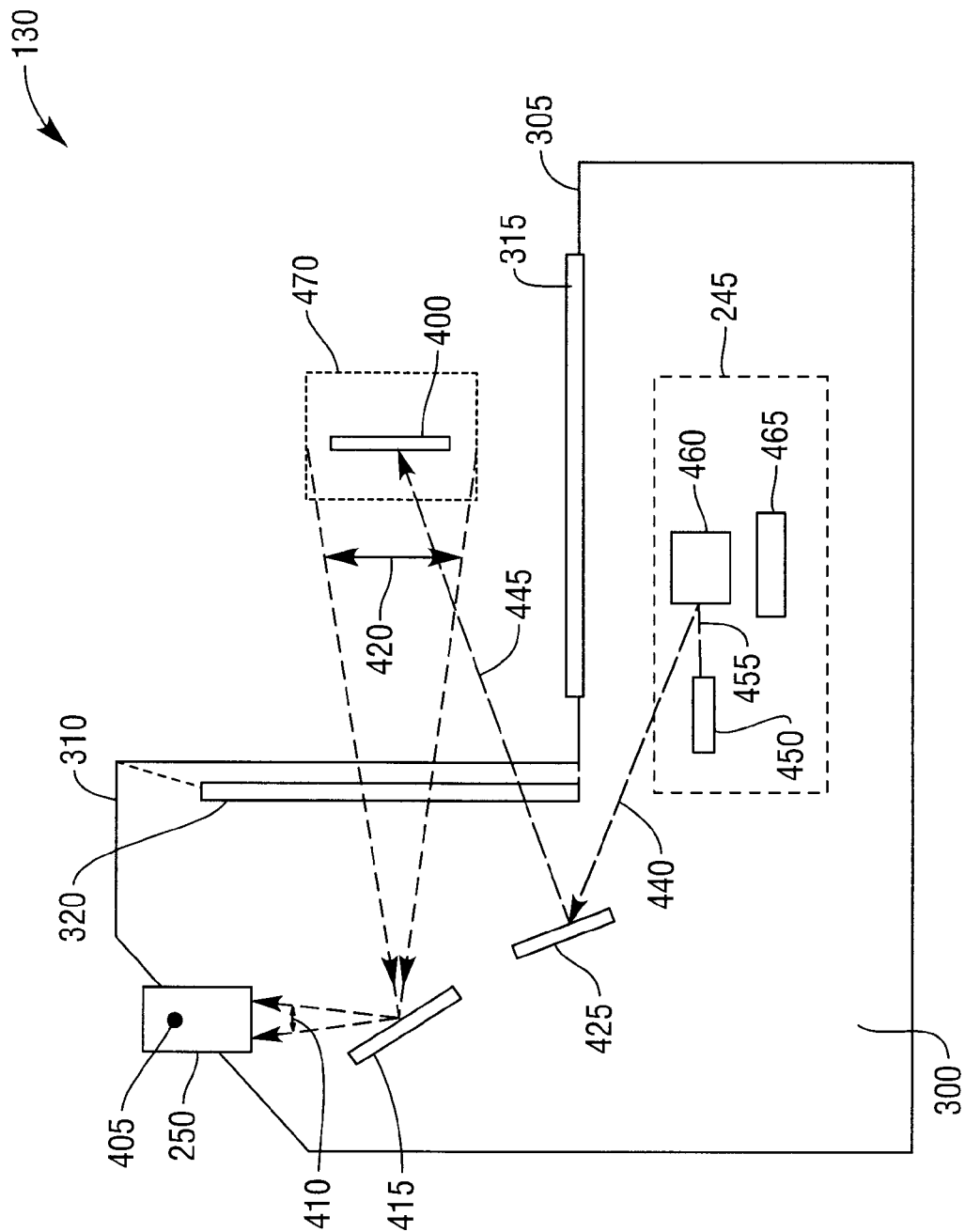
FIG. 4A is a high-level cross-sectional drawing illustrating the exemplar embodiment of the hybrid optical code scanner with a docked imaging scanner.

The laser scanner 245 includes a laser generation device (FIG. 4A, 450), a laser beam directing device (FIG. 4A, 460) for directing a laser beam (FIG. 4A, 455) generated by the laser generation device (FIG. 4A, 450) and a photo-detector (FIG. 4A, 465) for detecting laser light reflected from an optical code back to the laser scanner 245. The laser scanner 245 also includes a pattern mirror (FIG. 4A, 425) used to direct a laser beam (FIG. 4A, 440) reflected by the laser beam directing device (FIG. 4A, 460).

The imaging scanner 250 is removable handheld scanner and can be used in either a docked or undocked position. When operated in the undocked position, a user will remove the imaging scanner 250 from its docked position in the hybrid scanner 130 and move it to a location where it can capture an image of an optical code. When operated in the docked position, the imaging scanner 250 works with the laser scanner 240 to read optical codes presented to the hybrid scanner 130 for reading.

The imaging scanner 250 includes an image capture device such as a CMOS image sensor. The imaging scanner 250 captures an image of the optical code and processes the image to recover data encoded in the optical code.

The imaging scanner 250 also includes a wireless controller (not shown) that communicates over a wireless network 275 to the wireless network controller 270 of the hybrid scanner 130 and then to the processor 220. The imaging scanner 250 communicates image and other data over the wireless network 275. In some embodiments, the imaging scanner 250 uses the bus 240 to communicate with the processor 220 when the imaging scanner 250 is docked with the hybrid scanner 130. The bus 240 also provides power to operate the imaging scanner 250 and to charge a battery (not shown) located in the imaging scanner 250 when the imaging scanner 250 is docked to the hybrid scanner 130.

The communications controller 260 includes hardware and software required to communicate with external devices over the computer network 150. In some embodiments, the computer network 150 is implemented using a USB bus that connects the hybrid optical code scanner 130 to the POS computer 110.

The imaging scanner 130 includes a speaker 265 used by the imaging scanner 130 to audibility communicate with a user of the pos terminal 105.

Figure 3:
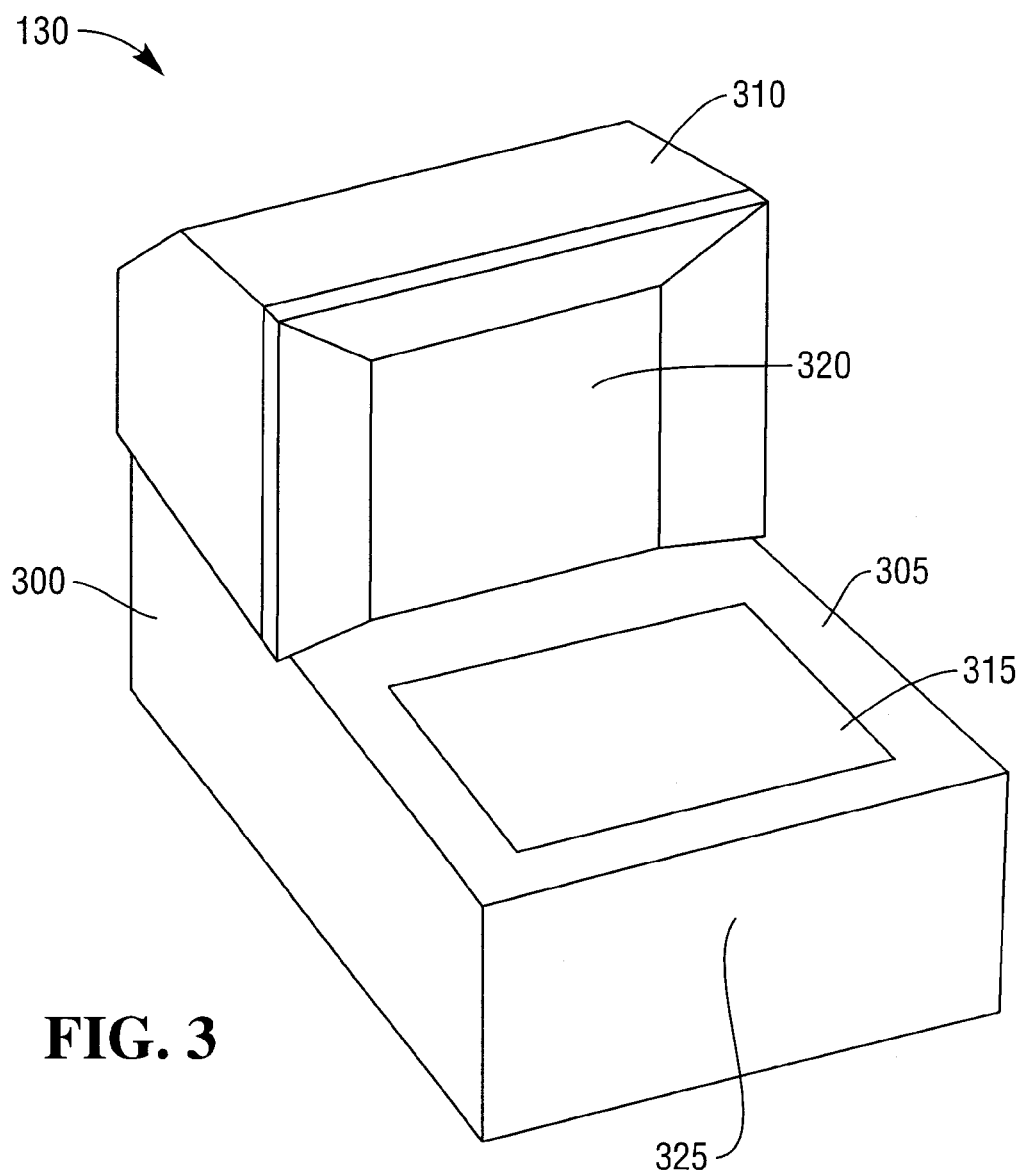
FIG. 3 is a high-level drawing illustrating an exemplar embodiment of a hybrid optical code scanner.

Turning to FIG. 3, there is provided a high-level drawing illustrating an exemplar embodiment of the hybrid optical code scanner 130. The hybrid optical code scanner 130 includes a housing 300 comprising a vertical housing component 310 and horizontal housing component 305. The vertical housing component 310 includes vertical scanning window 320 and the horizontal housing component 305 includes a horizontal scanning window 315. The vertical scanning window 320 faces the front 325 of the hybrid optical code scanner 130. An operator/user of the hybrid optical code scanner 130 stands in front 325 of the hybrid optical code scanner 130 facing the vertical scanning window 320 and moves optical codes (FIG. 4A, 400) for scanning through a first volume of space (FIG. 4A, 470) generally above the horizontal scanning window 315 and in front of the vertical scanning window 320.

With reference to FIG. 4A, there is provided a high-level cross-sectional drawing further illustrating the exemplar embodiment of the hybrid optical code scanner 130 where the imaging scanner 250 is docked to the hybrid scanner 130. The pattern mirror 425 is one of a plurality of pattern mirrors (not shown). The pattern mirror 425 receives the laser beam 440 from a laser beam directing device 460 and reflects the laser beam 445 through the vertical scanning window 320 to an area in front of the vertical scanning window 320 and generally over the horizontal scanning window 315. In some embodiments, the laser beam 445 is directed to an area that may extend past the perimeter of the horizontal scanning window 315. The laser beam directing device 460 causes the laser beam 445 to move so that it scans a volume of space. If the laser beam 445 strikes and moves across an optical code 400, the reflected laser light is directed (directing devices not shown) back to the laser scanner 245 where the laser light is detected to the photo-detector 465 and data encoded in the optical code read. Laser scanners, in general, are best suited to read one dimensional (1D) barcodes (which are included as an optical code).

The imaging scanner 250 is shown in a docked position in the vertical housing 310. In the docked position, an image from the optical code 400 travels along a path 420 through the vertical scanning window 320 to a mirror 415 and then is reflected along a path 410 to the imaging scanner 250 for capture and processing.

Figure 4B:
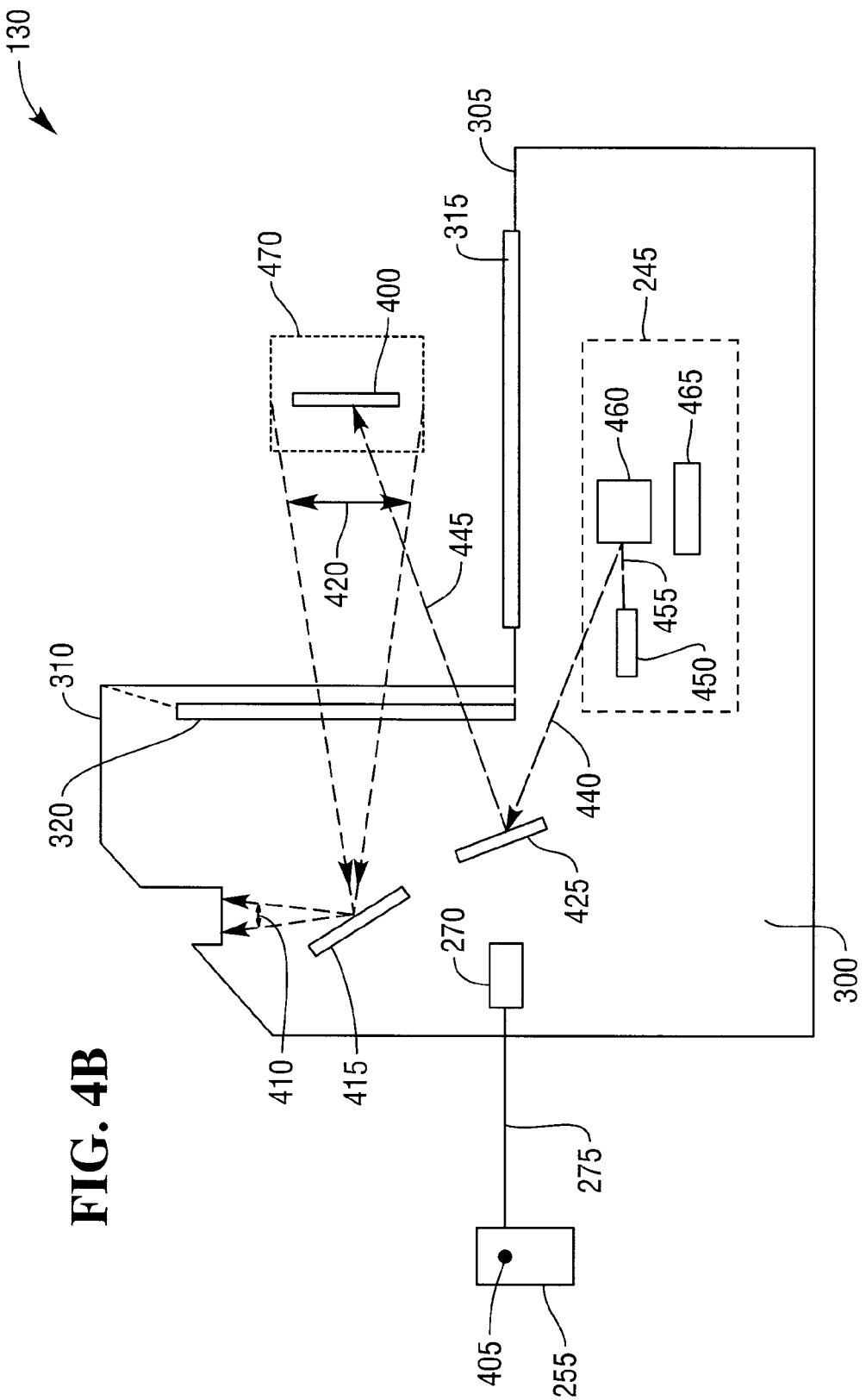
FIG. 4B is a high-level cross-sectional drawing illustrating the exemplar embodiment of the hybrid optical code scanner with an undocked imaging scanner.

Turning to FIG. 4B, there is provided a high-level cross-sectional drawing further illustrating the exemplar embodiment of the hybrid optical code scanner 130 where the imaging scanner 250 is undocked. The imaging scanner 250 has been removed from the hybrid scanner 130 to a location remote from the hybrid scanner 130. The imaging scanner 250 communicates with the hybrid scanner 130 over the wireless network 275. The wireless network controller 270 communicates with the imaging scanner 250 when it is in range. When the imaging scanner 250 is moved beyond the range of the wireless network 275, communications with the imaging scanner 250 is lost and the wireless network controller 270 sends an "out of range" event signal to the processor module 215 indicating the communications with the imaging scanner 250 has been lost. In response to receiving the event signal, software running in the processor module 215 causes the speaker 265 to output an audibly sound to alert the user that the imaging scanner 250 has been move beyond the communications range of the hybrid scanner 130.

Each handheld imaging scanner 250 is paired with a single hybrid scanner 130 and only communicates with the paired scanner 130. The imaging scanner 250 includes a switch 405 used to signal the hybrid scanner 130. When a user actives the switch 405, the imaging scanner 250 sends an alert signal over the wireless network 275 to the hybrid scanner 130. When the alert signal is received, software running in the processor module 215 causes the speaker 265 to output an audibly sound to notify the user that the switch 405 on the imaging scanner 250 was activated. This feature provides the user a method to determine which hybrid scanner 130 a particular imaging scanner 250 is paired with.

In addition, the software has the ability to detect when the imaging scanner 250 is docked or undocked with the hybrid scanner 130. When the software detects the undocking of the imaging scanner 250, it starts the timer after setting it to timeout after a predetermined period of time has passed. The software is notified when the timeout occurs. If the timeout occurs, software running in the processor module 215 causes the speaker 265 to output an audibly sound to notify the user that the imaging scanner 250 has been undocked from the hybrid scanner 130 for too long and it should be returned and docked with the hybrid scanner 130. The predetermined period of time is a system parameter and can be changed as needed.

Figure 5:
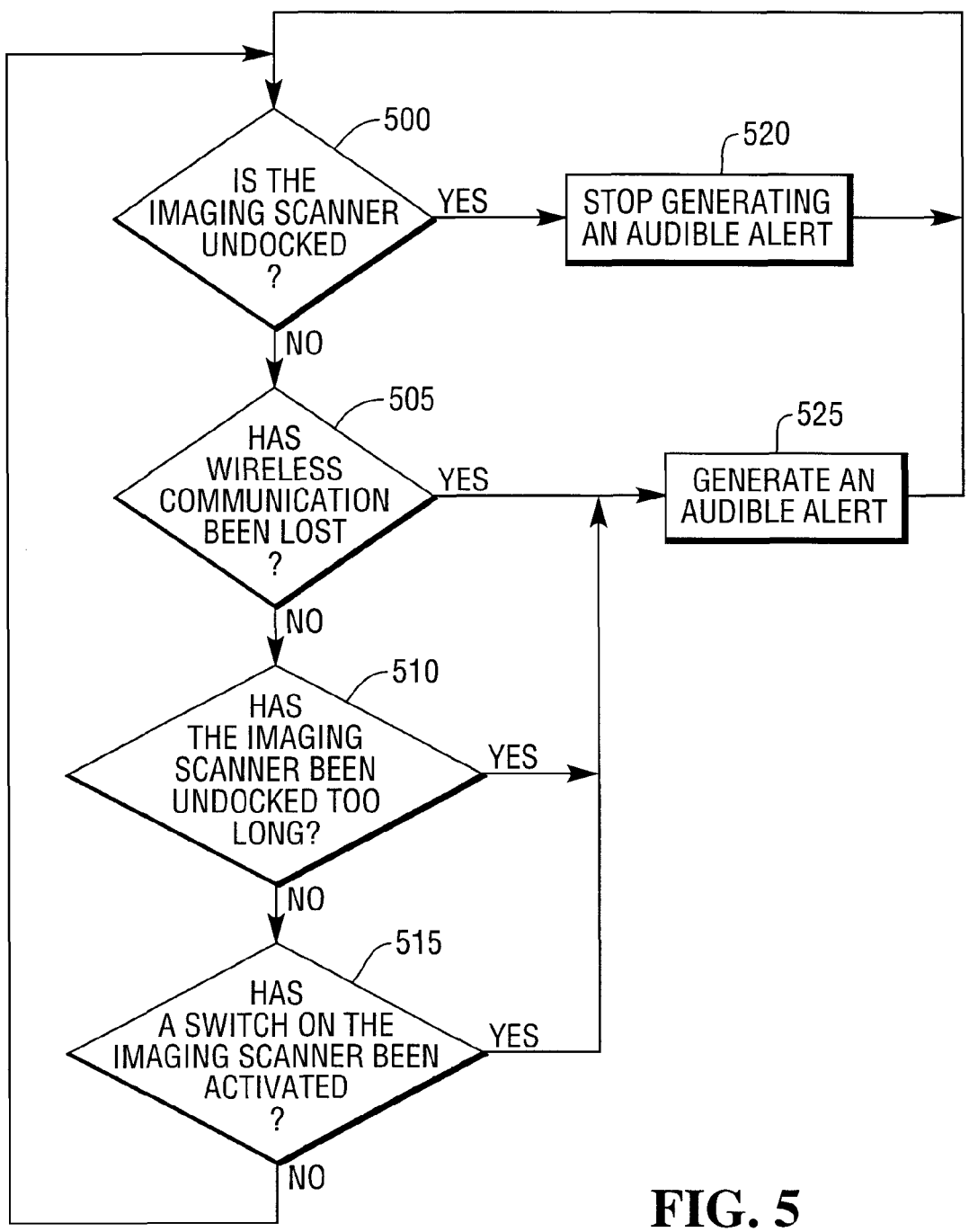
FIG. 5 is a high-level flow chart depicting an exemplary method for operating an alert function of the hybrid optical code scanner.

Turning to FIG. 5, there is provided a high-level flow chart depicting an exemplary method for operating the alert function of the hybrid optical code scanner 130. The method depicted is implemented by software stored in the memory 225 and executed by the processor 220 in the hybrid optical code scanner 130. In step 500, the software determines if the imaging scanner 250 is docked to the hybrid scanner 130. If the imaging scanner 250 has been removed or undocked from hybrid scanner 130, the software starts a timer and passes control to step 505. In step 505, the software determines if wireless communications between the imaging scanner 250 and the hybrid scanner 130 has been lost. Communications is typically lost, when the imaging scanner 250 is moved beyond the range of the wireless communications of the hybrid scanner 130. If communications is lost, control passes to step 525 where an audible alert is generated. If communications is not lost, control is passes to step 510.

In step 510, the software determines if the timer started in step 500 has reached or exceeded a predetermined time value. The predetermined time value is a system parameter of the hybrid scanner 250 that represents the maximum time period the imaging scanner 250 can be undocked from the hybrid scanner 130. If the predetermined time value has been reached, control passes to step 525 where an audible alert is generated. If the predetermined time value has not been reached, control passes to step 515.

In step 515, the software determines if the switch 405 on the imaging scanner 250 has been activated by a user. If a user activates the switch 405, a signal is sent over the wireless network 275 to the hybrid scanner 130 and is received by the software. If the switch 405 is activated, control passes to step 525 where an audible alert is generated. If the switch 405 is not activated, control passes to step 500. This feature allows a user to determine which hybrid scanner 130 a handheld imaging scanner 250 is paired with. The user activates the switch 405 on the imaging scanner 250 and then determines which hybrid scanner 130 generates the audible alert.

Although particular reference has been made to an embodiment that includes a hybrid optical code scanner in an assisted point of sale terminal, certain other embodiments, variations and modifications are also envisioned within the spirit and scope of the following claims. For example, there are embodiments where the invention is used in self-service point of sale terminals and kiosks.

I claim:
1. A hybrid optical code scanner comprising:
   a housing containing a docking portion and an aperture in the docking portion; a speaker integrated within in the housing where the speaker produces audible sounds; a laser scanner in the housing adapted to read first optical codes presented to
the hybrid optical code scanner for reading, where the laser scanner is located in the housing;
   an imaging scanner removable from the docking portion, wherein the image scanner is adapted to read the first optical codes through the aperture in the docking por- tion, where the imaging scanner is removable from the housing and when the imaging scanner is docked to the housing and adapted to read, it reads second optical codes presented to the hybrid optical code scanner for reading and when the imaging scanner is undocked from the housing, it is operated by hand and reads optical codes remote from the hybrid optical code scanner; and a mirror in the housing for directing images containing the first optical codes to the imaging scanner through the aperture in the docking portion when the imaging scanner is docked to the housing;

where an audible alarm is sent to the speaker when an event related to the imaging scanner being removed from the housing occurs.

2. The hybrid optical code scanner of claim 1, wherein the event occurs when the imaging scanner has been removed from the housing for more than a predetermined period of time.

3. The hybrid optical code scanner of claim 1, wherein the event occurs when a switch on the imaging scanner that has been removed from the housing is activated.

4. The hybrid optical code scanner of claim 1, further including:
a wireless network that transfers data between the imaging scanner and the hybrid optical code scanner; and
wherein the event occurs when the wireless network loses contact with the imaging scanner because the imaging scanner has been moved beyond the range of the wireless network.

5. The hybrid optical code scanner of claim 1, wherein the alarm is an audible tone.

6. The hybrid optical code scanner of claim 1, wherein the alarm includes one or more audible words describing the event causing the alarm.

7. The hybrid optical code scanner of claim 1, wherein the sounding of the alarm stops when the imaging scanner is returned to the housing.

8. The hybrid optical code scanner of claim 1, wherein the imaging scanner is paired to the hybrid optical code scanner and only communicates with the paired hybrid optical code scanner.

9. An optical code scanner comprising:
a housing containing a docking portion and an aperture in the docking portion; a first scanner in the housing adapted to read first optical codes;
a second scanner removable from the docking portion, wherein the second scanner is adapted to read the first optical codes through the aperture in the docking portion when the second scanner is docked to the housing and adapted to read second optical codes when the second scanner is undocked from the housing;
a mirror in the housing for directing the first optical codes to the second scanner through the aperture in the docking portion when the second scanner is docked to the housing; and
a speaker integrated within the housing for producing audible sounds;
wherein an audible alarm is sent to the speaker when an event related to the second scanner being removed from the housing occurs.

10. The optical code scanner of claim 9, wherein the event occurs following timing of a predetermined time period by the first scanner following removal of the second scanner from the docking portion.

11. The optical code scanner of claim 9, wherein sounding of the alarm stops when the second scanner is returned to the docking portion.

12. The optical code scanner of claim 9, wherein the first scanner comprises a laser.

13. The optical code scanner of claim 9, wherein the second scanner comprises an imager.

14. The optical code scanner of claim 9, wherein the housing comprises a vertical housing component with a vertical scanning window and a horizontal housing component with a horizontal scanning window, and wherein the mirror directs the first optical codes from a direction through the vertical scanning window.

15. The optical code scanner of claim 14, wherein the docking portion is located in the vertical housing component.

16. An optical scanning method comprising:
activating a first scanner in a scanner housing and a removable second scanner in a docking portion of the scanner housing to read a first optical code during a first mode of operation;
directing the first optical code to the second scanner through an aperture in the docking portion during the first mode of operation;
reading a second optical code by the second scanner during a second mode of operation when the second scanner is undocked from the docking portion; and
sending an alarm to a speaker integrated within in the scanner housing when an event related to the second scanner being removed from the docking portion occurs.

* * * * *